United States Patent [19]
Saccomani et al.

[11] 3,953,669
[45] Apr. 27, 1976

[54] VIDEO TRACKING SYSTEM

[75] Inventors: Georges Saccomani; Leonidas Symaniec, both of Paris, France

[73] Assignee: Thomson-CSF, Paris, France

[22] Filed: Aug. 30, 1974

[21] Appl. No.: 502,205

[30] Foreign Application Priority Data
Aug. 31, 1973 France .................... 73.31521

[52] U.S. Cl. .................... 178/6.8; 178/DIG. 21; 250/203 CT
[51] Int. Cl.² .................... H04N 7/18
[58] Field of Search .................... 178/DIG. 21, 6.8; 250/203 CT

[56] References Cited
UNITED STATES PATENTS

| | | | |
|---|---|---|---|
| 3,505,666 | 4/1970 | Thorpe | 250/203 CT |
| 3,700,799 | 10/1972 | Stedman | 178/DIG. 21 |
| 3,712,957 | 1/1973 | Kuhn | 178/DIG. 21 |
| 3,728,478 | 4/1973 | Turner | 178/DIG. 21 |
| 3,730,277 | 5/1973 | Brugler | 178/DIG. 21 |
| 3,736,376 | 5/1973 | Kato | 178/DIG. 21 |
| 3,828,122 | 8/1974 | McPhee | 178/DIG. 21 |
| 3,865,974 | 2/1975 | Alpers | 178/DIG. 21 |

*Primary Examiner*—Howard W. Britton
*Assistant Examiner*—Michael A. Masinick
*Attorney, Agent, or Firm*—Karl F. Ross; Herbert Dubno

[57] ABSTRACT

The field observed by a video camera includes a desired target which is to be encompassed by an electronic window. The acquisition of the target is controlled initially by a light pen to position the electronic window on the target displayed on the screen of a receiver. Automatic video tracking proceeds then by measuring the mean video level in the vicinity of the target, adjusting the signal to this level and rectifying it, and then periodically measuring the difference in energy in the two successive halves of the window along the axis in question, this measurement giving the positional divergence between the center of the window and the energy center of the target. Corresponding error signals are used to move the window to keep the target centered therein.

10 Claims, 9 Drawing Figures

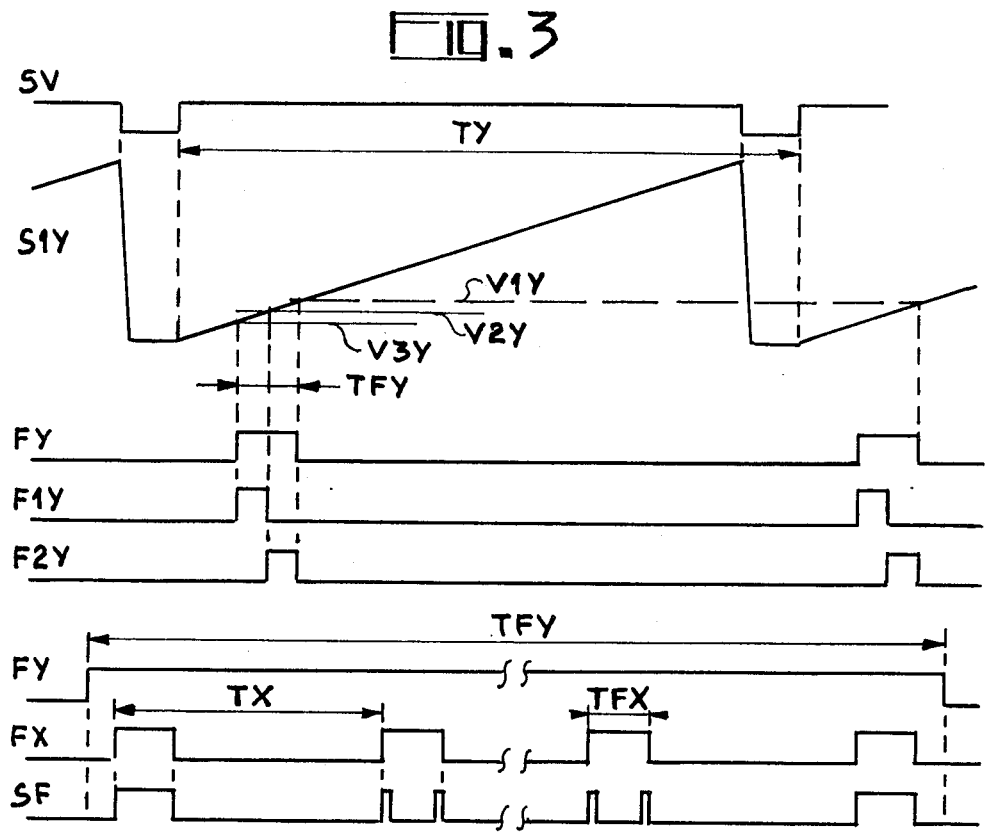
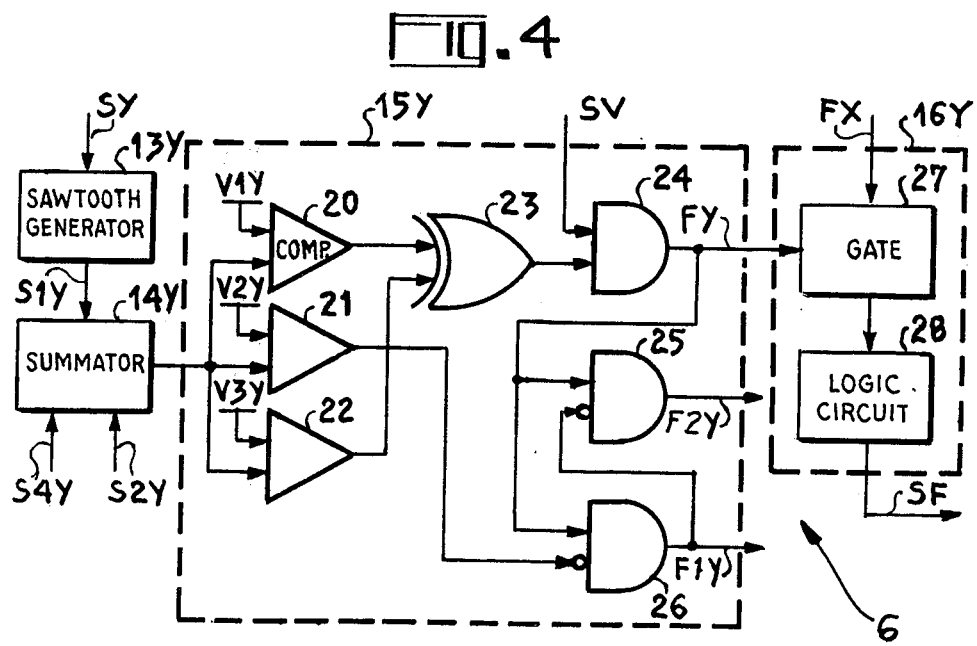

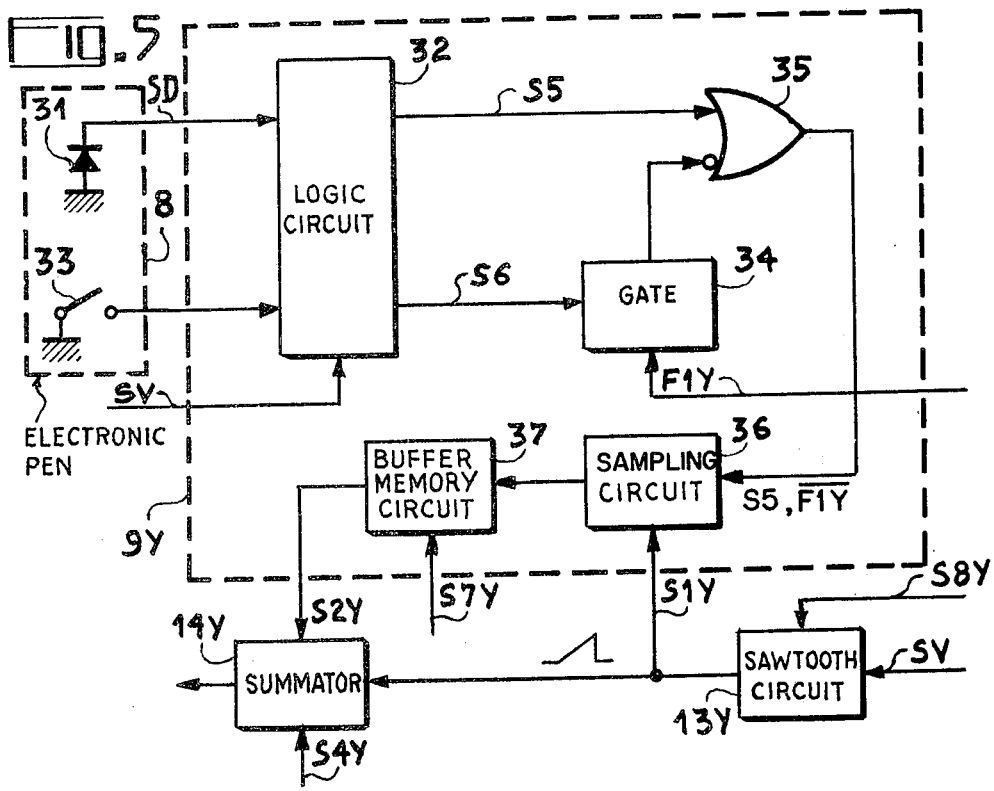
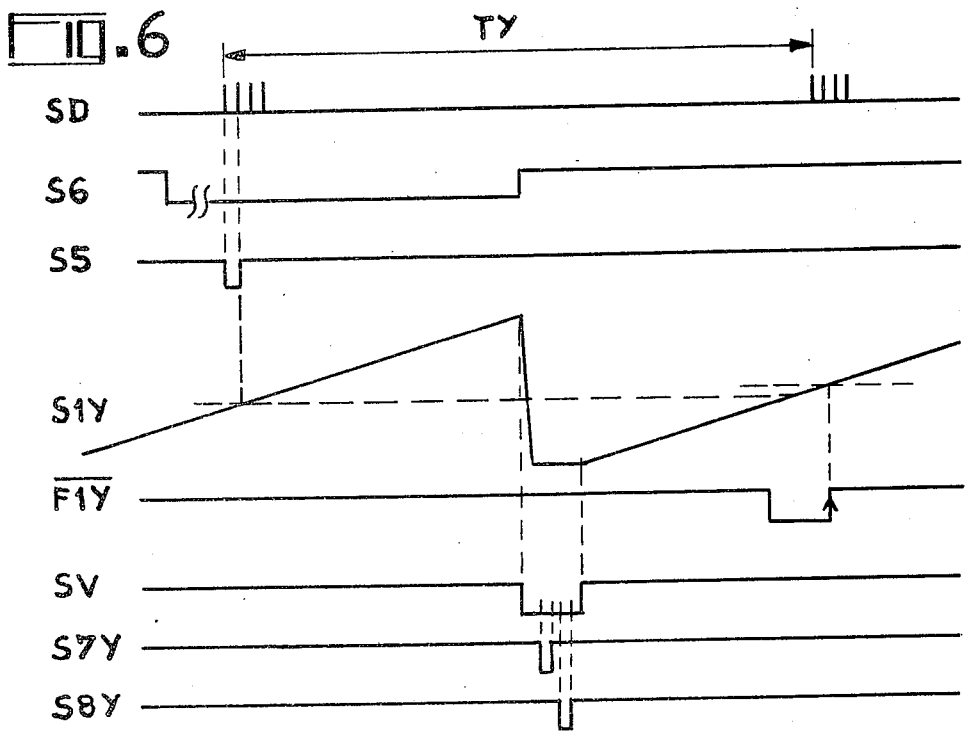

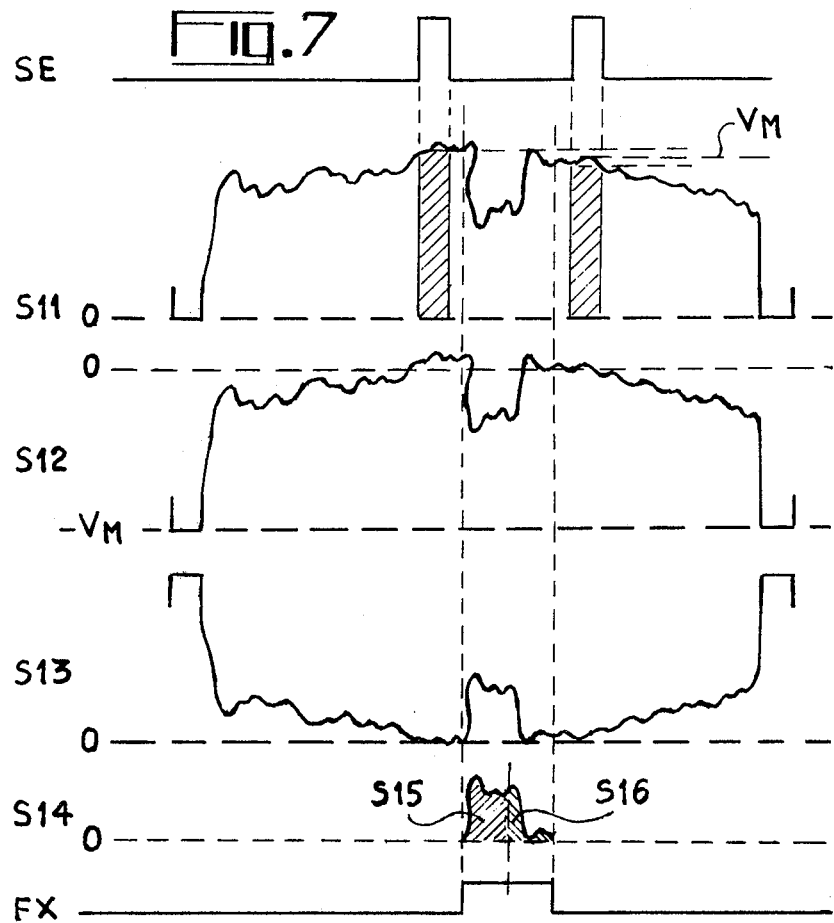
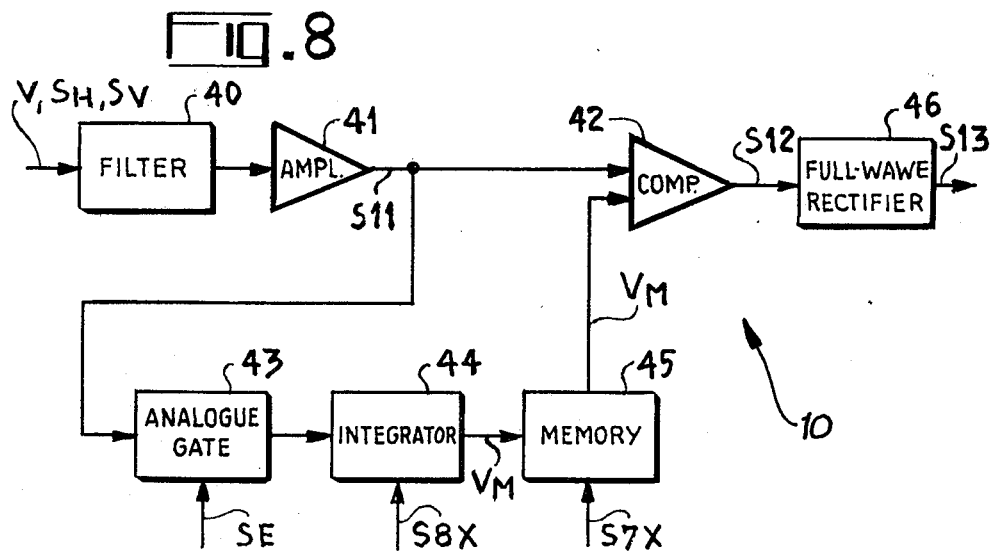

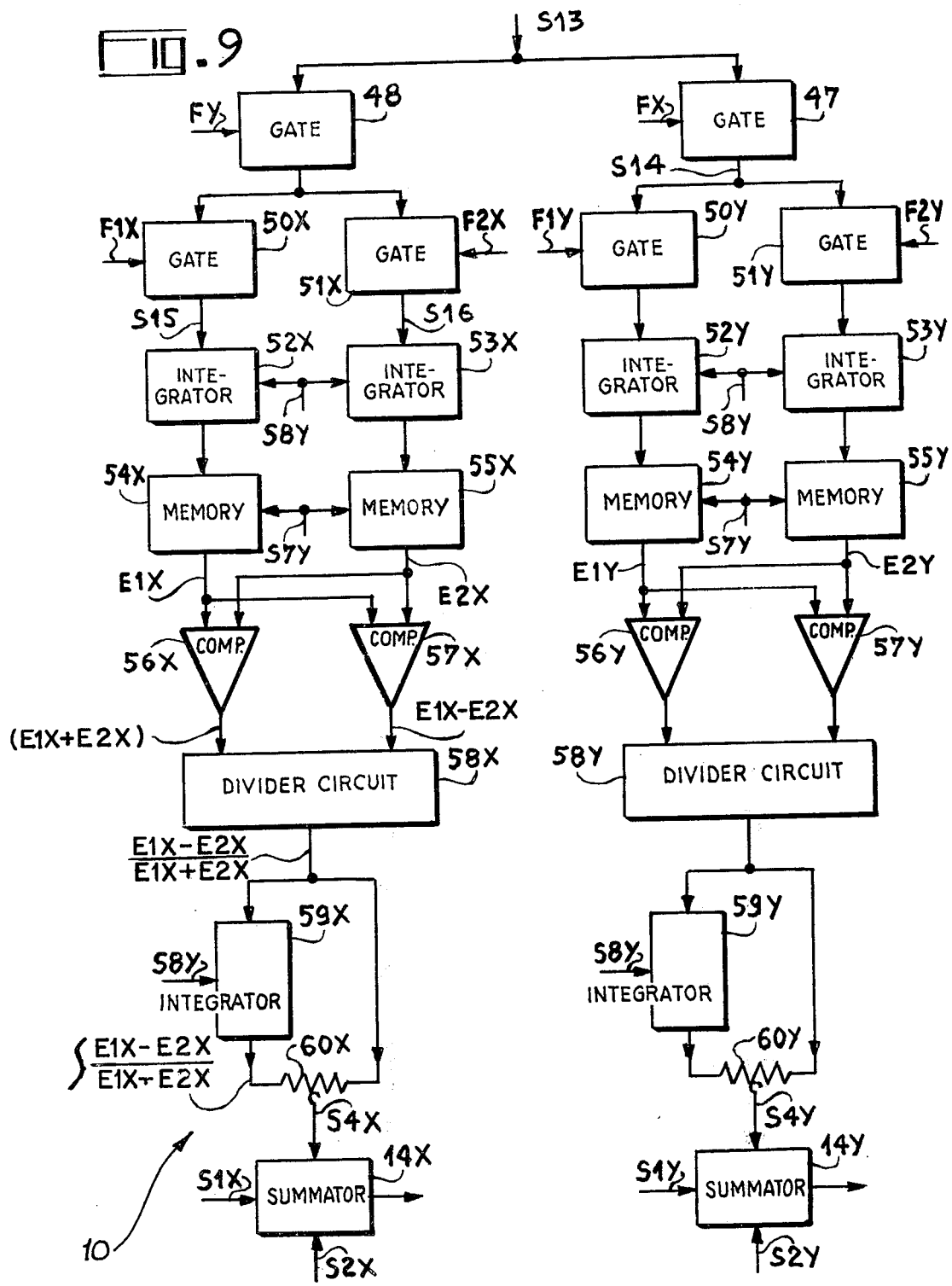

VIDEO TRACKING SYSTEM

The present invention relates to an improved video tracking system which operates by analysing video contrast and enables the tracking of rapidly moving targets.

In more precise terms, the invention relates to such a system in which a field of observation containing the target to be tracked is displayed on the screen of a cathode-ray tube. Tracking is preceded by a target-seeking phase to allow the target to be brought into the observed field, and then by an acquisition phase. Initially, the latter phase may be under the control of the operator who, after the target has been recognized visually on the screen, gives a rough indication of its position by means of a movable marker of the electronic-window type which is displayed on the screen. A limited part of the field of observation, which corresponds substantially to the area covered by the target, may be isolated and concentrated upon in this way by means of the window. After the window has been placed on the target, the acquisition phase is at an end and the tracking process may then be set in motion with the analysis of the video contrast between the target and its immediate surroundings. The window is then locked on to the target and follows its maneuvers in the observed field. The data giving the position of the window may be used to measure the misaiming of the target from the central axis of the field or sighting axis. With the aid of a follower control, the result of the measurement may be used to train on the target automatically by keeping the sighting axis and the target coincident.

The means used to detect the field of observation, to produce a corresponding video signal, and to display the field advantageously consist of a combination of a conventional television camera and receiver. Automatic television tracking systems make it possible to detect and track targets whose contrast varies in relation to the field background. They have the advantage that are passive and have technical qualities related to the capability which image tubes have of allowing high-definition analysis of the field and to the ease with which the video-frequency signal produced can be processed.

The operating capabilities of a video tracking system depend essentially on its ability to differentiate between a designed target and the background which appears in the field of view of the camera. The performance of such tracking systems is bascially a matter of the process of video-contrast analysis which is used.

An object of the invention is to produce an operational system in which tracking remains effective even with major changes in the luminosity of the target and/or of the background surrounding the tracked target.

In accordance with a feature of the invention, the system incorporates automatic tracking means which measure, line by line, the mean video level existing in the vicinity of the target, which adjust the video signal to this mean reference level, which full-wave rectify the signal so adjusted, which then, along the line-scan and frame-scan axes respectively, measure the energy presented by the video signal in the electronic tracking window in the two successive halves of the window situated along the axis in question, and which compare the measured results, these results corresponding substantially to the cartesian co-ordinates for the divergence between the center of the window and the energy center or barycenter of the target.

The structural and operational aspects of our invention, together with further objects and advantages thereof, will best be understood from the following description given in connection with the accompanying drawing in which:

FIGS. 3 and 4 show an embodiment of window-generating circuits suitable for use in the system of FIG. 1 and related waveforms;

FIGS. 5 and 6 show an embodiment of acquisition circuits suitable for use in the system of FIG. 1 and related waveforms; and FIGS. 7 to 9 show an embodiment of video tracking circuits suitable for use in the system of FIG. 1 and related waveforms.

Figure 1:
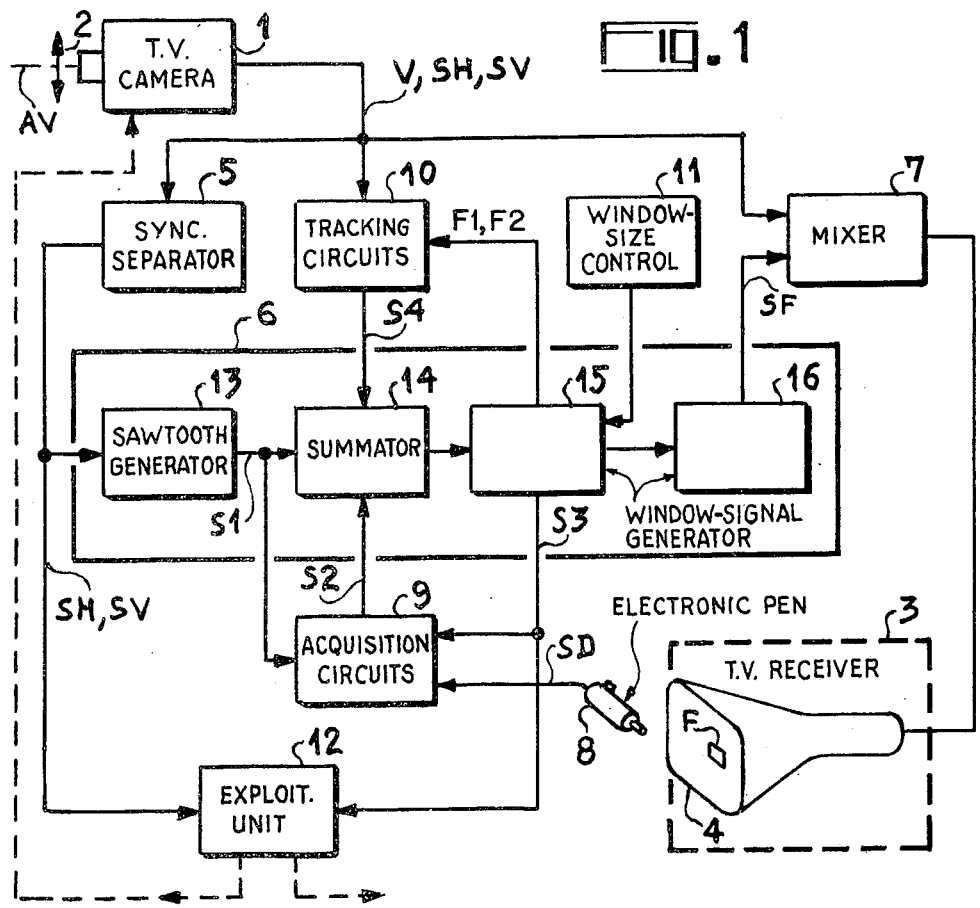
FIG. 1 shows a simplified block diagram of a video tracking system embodying our invention.

The automatic television tracking system shown in FIG. 1 comprises a conventional type of television camera 1 containing a pick-up tube and its associated supply and scanning circuits. An optical lens 2 allows the observed field to be focused, with optical axis AV corresponding to the sighting axis of the camera or the direction in which it is trained. The signal produced is a composite one, consisting of a video-frequency signal V and of horizontal (SH) and vertical (SV) synchronizing pulses for the line-by-line scan. The line or horizontal scan determines the direction of a first reference axis for measurement which will be termed the X axis hereinafter. The frame or image scan, which is known as the vertical scan, determines the direction of a second or Y axis perpendicular to the X axis.

Figure 2:
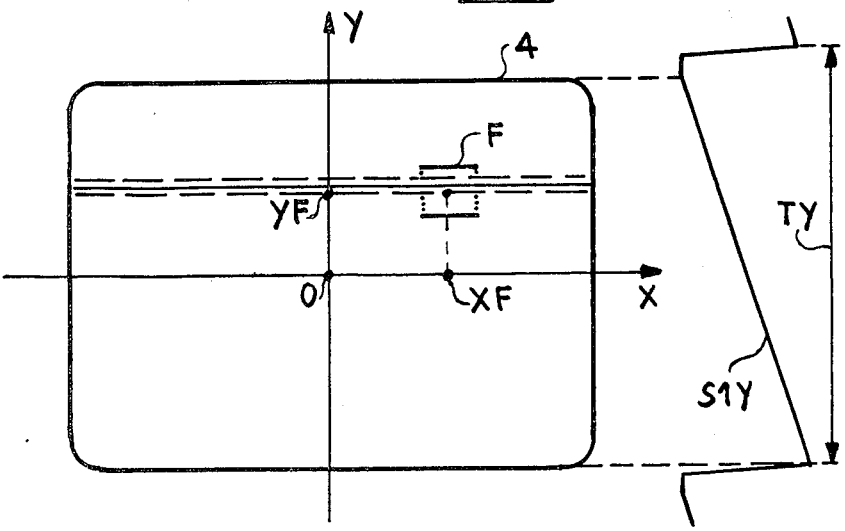
FIG. 2 is a diagram showing the display screen and a vertical-scan waveform.

A television receiver or monitor 3, which is likewise of a conventional type, is fed with the composite signal so as to display the field observed by camera 1 on its screen 4. The center of the image corresponds to the position of the optical axis AV. FIG. 2 shows the screen and the X and Y axes which intersect at the geometrical center O of the screen.

Circuits 5, 6 and 7 generate a rectangular electronic window F (FIG. 2). Synchronizing circuit 5 receives the composite input signal from camera 1 and extracts from it the synchronizing pulses SH, SV. Also, it produces from these pulses several synchronizing and control signals which are used in operating the various circuits making up the system. Circuit 6 produces from the synchronizing signals a brightness-boosting or beam-intensifying signal SF which is mixed at 7 with the composite input signal so as to delineate the electronic window F on the monitor screen along with the field of observation.

Acquisition means consist of a photo-detector device 8, known as a light pen, and a circuit 9. The light pen includes a photo-sensitive component such as a photodiode 31 and a manually operated switch 33 (FIG. 5). When the free end of pen 8 is aimed by the operator at a selected point on the screen 4, the diode is sensitized by the luminous flux which results from the electron beam sweeping across the limited area, virtually a point, at which the pen is pointing. By operating the switch, the operator allows the signal SD which is detected by the diode to be transmitted to circuit 9. Signal SD represents information on the position of the point at which the pen is aimed on the screen, this point pertaining to a desired target to be tracked after preliminary searching operations which result in its being located in the field of observation and recognized visually on the receiver display screen. We shall now assume that searching has been completed and that the desired target is present in the field and can be identified on the viewing screen by its shape and contrast. Conventional ancillary means are employed to carry out the searching process by directing the camera across the area to be explored. The acquisition circuit 9 is duplicated and incorporates, for each axis, a memory circuit which receives the detected signal SD and, depending on the axis in question, the sawtooth signal S1, FIG. 1, for either horizontal (S1X) or vertical (S1Y, FIG. 2) scanning to produce a signal S2 for each axis which is equivalent to the level of the sawtooth at the moment when the detected signal appears. The levels S2X and S2Y represent the initial position of the window center for the acquisition phase. The initial positioning is performed by assembly 6 and then, after a given number of vertical scans, the detected signal SD is replaced by a signal S3 for the center of the window having components S3X and S3Y along the respective axes. The first stage of acquisition thus consists in a fast initial locking of the window to the area at which the light pen is pointed, on the basis of signal SD, and in thereafter locking the position of the center of the window into this area by means of signal S3. Since the sight area of the pen is small in size, assuming the pen to be correctly aimed at the target by the operator, the area in question will be substantially central in the window after acquisition, which makes it easy to lock on the tracking loop.

Automatic tracking circuits 10 carry out a contrast analysis on the video signal contained in the window so as to produce a signal S4 which corresponds to the positioned divergence between the center of the window and the energy center or barycenter of the signal selected, which in practice is constituted by the target video signal. In the same way as the acquisition circuits 9, the tracking circuits 10 are duplicated and consist of X and Y channels. The error signal S4 is measured periodically, at a frequency which is the same as, or a multiple of, the frame-scan frequency, and is applied to a summator circuit 14 in assembly 6 where it is added, in both magnitude and sign, to the sawtooth scan signal S1 so as to enable the position of the window to be locked into that of the target. The particular video-analysis process employed consists of the following successive stages: the measurement of a video reference level equivalent to the mean video level for the target's immediate surroundings, the adjustment of the video signal to this reference level, the full-wave rectification of the video signal which has been adjusted in this way, the selection of the rectified video signal contained in the window, and the measurement along each axis of the divergence between the center of the window and the barycenter, which is done by measuring the respective energies in the two successive halves of the window along the axis in question and comparing the measured results. This process is described in greater detail below with reference to FIGS. 7 to 9.

Control circuits 11 of conventional type enable the size of the window to be adjusted to that of the target. Operation in the video tracking mode calls for the size of the window to remain sufficiently well matched to that of the target to encompass it entirely and fairly tightly. This is achieved by using the video contrast which exists between the target and its immediate surroundings, which are formed by the background in the field, this contrast being used both for video analysis and for the visual recognition and identification carried out by the operator. The construction of circuits 11 is immaterial for the purpose of our present invention and depends on the type of application envisaged. In the case of a target which varies slowly, the control may be of a simple manual type which causes either a progressive or a stepped variation, or of a semi-autamative type. Where the target varies rapidly, a more elaborate automatic type of control may be necessary.

Ancillary exploitation unit 12 generally consists of conventional circuits for measuring aiming error, i.e. the angle included between axis AV and the line along which the target lies. This angle is known from the deviation of the co-ordinates for the center of the target with respect to the center of the image. Synchronizing signals SH and SV enable the center O of the image, which is taken as the origin, to be established and components S3X and S3Y of center-of-window signal S3 substantially indicate the center of the target. Measuring the difference gives the aiming error XF, YF (FIG. 2). The aiming-error information may be used for automatic control of the X and Y orientation of the camera so that the target remains centered in the field as is well known per se.

Each of the window-generating circuits contained in unit 6 is divided into two halves, one for each measurement axis. Unit 6 comprises a series arrangement of a circuit 13 for generating the sawtooth scan signal S1X or (S1Y) from the respective synchronizing signal SH or SV, a summator circuit 14 in which the sawtooth signal has added to it voltages corresponding to the position signal S2 and the positional-error signal S4, and a circuit 15 which supplies the window signals FX and FY (FIG. 3). Circuit 15 also produces half-window timing pulses F1X, F2X for the X axis and F1Y, F2Y for the Y axis (FIG. 3), collectively indicated at 71 and 72 in FIG. 1. The brightness-boosting signals SF are produced by a circuit 16 from the window signals FX and FY.

An embodiment of an automatic video tracking system according to our invention will now be described in greater detail with reference to FIGS. 3 to 9.

FIG. 4 shows details of the electronic window-generating unit 6 (FIG. 1).

Circuits 13, 14 and 15 in FIG. 1 contain an X channel and a Y channel which receive the respective synchronizing signals SH and SV from circuit 5. Only the Y channel 13Y, 14Y, 15Y, 16Y is shown in FIG. 4 for the sake of simplicity and related waveforms are shown in FIG. 3. The X channel is formed in a similar way. The vertical sawtooth voltage S1Y which is received at the output of the summator circuit 14Y together with the appropriate levels S2Y and S4Y supplies three threshold comparators 20, 21 and 22 which are connected as triggers. Three threshold values V1Y, V2Y, V3Y are provided by circuit 11 (FIG. 1) and may be adjusted, manually or otherwise, as discussed above. A simple logic assembly which comprises an Exclusive-Or gate 23 and three AND circuits 24, 25 and 26 enables the window signal FY and the two half-window timing signals F1Y and F2Y for the Y axis to be obtained.

Thus, as shown in FIG. 3, sawtooth wave S1Y on its rising flank successively passes the voltage levels V3Y, V2Y and V1Y determining, with the aid of comparators 20 – 22, the beginning and the end of pulses FY, F1Y and F2Y. At level V3Y, comparator 22 energizes one input of EX-OR gate 23 which feeds an input of AND gate 24, the latter being unblocked during the forward sweep by voltage SV on another input. Gate 24 now conducts and emits the pulse FY to circuit 16Y and also to one input of AND gate 26 whose inverting second input does not receive voltage from comparator 21 at this time; pulse F1Y, marking the first (e.g. upper) half of a rectangular electronic window F (FIG. 2) along the Y axis, therefore comes into existence at the same time as pulse FY as likewise illustrated in FIG. 3. At the middle voltage level V2Y, comparator 21 becomes effective to cut off the AND gate 26, thereby terminating the pulse F1Y which up to that point blocked the generation of pulse F2Y by energizing an inverting input of AND gate 25 also having another input energized by pulse FY from gate 24. At this instant, therefore, pulse F2Y is generated to mark the second (lower) half of the window F. When the sweep reaches the last level V1Y, comparator 20 responds and cuts off the EX-OR gate 23 along with AND gates 24 and 25, thus terminating the two pulses FY and F2Y.

Circuit 16Y includes a gate 27 which is controlled by signal FY and which receives the analogously generated FX signal from the X channel at a second input. Signal FX is thus transmitted to the input of a logic circuit 28 only during the time TFY when signal FY is present, this time TFY substantially exceeding the recurrence period TX of signal FX. Circuit 28 produces the brightness-boosting signals SF which are of the configuration shown in FIG. 3, i.e. a rectangular pulse having the width TFX of signal FX at the beginning and at the end of period TFY and a pair of narrow spikes at the beginning and at the end of any other signal TX occurring within period TFY. Since period TFX measures the width and period TFY measures the height of window F, this configuration of signal SF (brought about by suitable timing means in circuit 28) marks the area of the window with a rectangular outline of increased brightness. Superimposing a continuous position signal S2Y on the sawtooth signal S1Y allows it to be shifted relative to the thresholds and thus displaces the window in the area of scan. By adding the horizontal and vertical components S4X, S4Y of the positional-error signal to the signals S2X, S2Y, representing the previous position of the window with reference to the scan origin along the respective co-ordinate axes it is possible to lock the window onto the target.

FIG. 5 relates to the acquisition circuits 8 and 9 (FIG. 1). The light pen 8 feeds a channel 9Y as shown, as well as a similar X channel which, for simplicity's sake, has not been shown. The signal SD which is detected by the photosensitive component 31 is applied to a logic circuit 32 where it is converted into a pulse S5 for the initial positioning of the center of the window. Pulse S5 is only transmitted to an OR gate 35 during a limited period after the switch 33 has been closed by the operator, this period covering at least one vertical scan of duration TY so that the positional information can be transmitted at least once. Circuit 32, receiving the synchronizing pulse SV from circuit 5 (FIG. 1), also produces a switchover signal S6 which controls a gate circuit 34 and prevents the locally generated half-window signal F1Y from being fed back to an inverting input of gate 35 during the aforementioned period. Thus, OR circuit 35 transmits first the start signal S5 for pre-positioning the window and then the inverted signal F1Y, also shown in FIG. 6, from whose trailing edge the aforementioned component S3Y of center-of-window signal S3 is derived. The output of OR circuit 35 controls a sampling circuit 36 which receives sawtooth signal S1Y from generator 13. The level of signal S1Y at the moment of occurrence of an output signal of gate 35, i.e. of a positive-going edge of a start pulse S5 or an inverted feedback pulse F1Y, is stored in a buffer memory circuit 37 which is connected at its output to summator circuit 14Y. Synchronizing signals S7Y and S8Y, generated by sync circuit 5 in the interval between the flyback and forward strokes of the vertical sweep as seen in FIG. 6, operate the buffer memory circuit 37 and the sawtooth generator 13Y, respectively, at the vertical scan frequency. Signal S7Y causes the Y level for positioning the center of the window to be transmitted to summator circuit 14Y and signal S8Y then periodically resets the sawtooth generator to zero at the end of each cycle.

The particular video-contrast-analysis process employed is illustrated in FIG. 7. The composite input signal provided by the camera is of the form shown at S11 in the course of a given line scan. To calculate the mean value of the video signal in the vicinity of the target, as a measure of the energy level of the background surrounding the target, samples are taken of this latter signal. Sampling takes place each time a line is scanned and the mean value is also measured line by line. To take the samples, a selector signal is produced locally either by the synchronizing circuit 5 alone (FIG. 1) or by circuits 5 and 6 together (FIG. 1). The selector signal extracts at least one sample. In the example shown the selector signal SE extracts two samples which are taken on either side of the horizontal window signal FX near the beginning and end of the window. These samples are thus outside the target signal which is assumed to be totally contained within the window. The number of samples may be greater than two. Signal SE may for example be obtained by means of complementary logic circuits in the X channel of circuit 15 which consist of two additional threshold comparators such as those shown at 20–22 in FIG. 4. In relation to the mean video level VM in its vicinity, the video target signal is either a positive or a negative signal or one which is alternately positive and negative. Signal S11 is adjusted to the measured reference level as shown at S12 and is then full-wave rectified to provide a signal S13. In this way a target which consists of a succession of light or dark areas may be reconstructed without loss of information. Only the signal portion S14 contained in the window is concentrated on, this signal portion substantially constituting the target signal. Measurements are then made by integration of the energy contained in the selected signal S14, two measurements being made along each axis, one relating to the energy contained in the signal which is confined to the first half of the window along the axis in question and the second relating to the energy contained in the signal which is confined to the second half of the window along this axis. Thus, in the case of the X channel, signal S14 is sub-divided into signals S15 and S16 by half-window timing signals F1X and F2X. The measurements made correspond to the energies contained in the respective signals S15 and S16, each of these measurements being accumulated for the various successive lines traversing the window F. In the case of the Y channel, the energy exhibited by signal S14 is measured first in the course of the various lines contained in the first half-window timed by signal F1Y and then in the course of those contained in the second half-window timed by signal F2Y. In both channels the two measurements are then compared so that the difference between them may be ascertained, this difference constituting information on the divergence between the center of the window and the energy center of signal S14 which to all intents and purposes is the positional error between the center of the window and the barycenter of the target along the axis in question. The measured results are compared cyclically during the vertical-scan flyback at a frequency which is the same as, or a multiple of, that of the vertical scan. The difference signals, which are obtained as continuous voltages, form the positional-error signals S4X and S4Y fed to the corresponding summator circuits 14X and 14Y so as to lock the center of the window onto the energy center of the target.

FIG. 8 shows a section of the video tracking circuits 10 diagrammatically represented in FIG. 1. This section is common to the X and Y channels and produces the rectified video signal after it has been adjusted to the reference level. The composite signal V, SH, SV supplied by the camera is applied to a filter circuit 40 the pass-band of which is matched to the minimum target-sweep duration envisaged. The filtered signal is amplified at 41 and is applied to a first input of a comparator circuit 42, such as a differential amplifier, and to the second input of this circuit via components 43 to 45. These latter include an analogue gate circuit 43 which is controlled by selector signal SE, an integrator circuit 44 and a memory circuit 45. The background video samples supplied by the gate circuit 43 are integrated at 44 to form the mean level VM. At the end of the line-scan the magnitude VM is transferred to the memory circuit 45 whose stored contents relating to the previous line are transmitted to comparator 42 in the form of a continuous voltage. The number of scan lines is assumed to be high so that the image is of high definition and there is thus a small variation in level VM from one line to the next. Thus, the analogue comparison which is made at 42 which a mean level which is one line out of step is of no practical disadvantage. The integrator circuit 44 and the memory circuit 45 are controlled by respective signals S7X and S8Y which are similar to those shown at S7Y and S8Y in FIG. 6 but which are produced at the line frequency. A circuit 46, which is fed by the comparator output S12, is a full-wave rectifier which produces the rectified video signal S13.

FIG. 9 shows the remaining section of the video tracking circuit 10 of FIG. 1. Signal S13 is applied to an X channel and a Y channel. An arrangement of three gate circuits enables the video signal to be selected for each channel. In the case of the X channel it comprises a gate circuit 48 which receives signal S13, is controlled by signal FY and works in parallel into a gate circuit 50X which is controlled by pulses F1X and a gate circuit 51X which is controlled by pulses F2X, so that these gates will respectively pass the signals S15 and S16 which form the signal S14 (FIG. 7) in the two successives X-channel halves of the window. Similarly, the Y channel includes a gate circuit 47 which receives the signal S13 and is controlled by signal FX, this circuit supplying the video signal S14 contained in the window simultaneously to gate circuits 50X and 50Y, which are controlled by respective half-window signals F1Y and F2Y. Each channel is thus subdivided into two sub-channels which consist of circuits for measuring the energy of the selected video signal in the corresponding halves of the window. In the case of each sub-channel the circuits in question consist of an integrator circuit 52X, 53X or 52Y, 53Y in series with a memory circuit 54X, 55X or 54Y, 55Y, these circuits being actuated cyclically at a period which is the same as, or a multiple of, the frame period TY by signals S8Y and S7Y (FIG. 6). The two memory circuits 54X, 54Y and 55X, 55Y in each channel supply a continuous voltage to a comparator 57X, 57Y of the differential-amplifier type. If the energy measured by circuits 52X/54X and 52Y/54Y in the first half-window along each axis is called E1X, E1Y and if that measured by circuits 53X/55X, 53Y/55Y in the second half-window is called E2X, E2Y, the output level from the comparator is proportional to (E1X–E2X) or (E1Y–E2Y) and may be used to supply the corresponding summator circuit 14X or 14Y.

The gradient of the error signal may vary to a fairly considerable degree as a function of the size of the target and of the window and of illumination in the observed field, and thus as a function of the changes in the total energy of the signal S14 contained in the window. An automatic-gain-control circuit makes it possible for the gradient in question to be kept virtually constant and operation to be stabilized. This circuit operates by dividing the error signal (which is the signal representing the difference between the signals originating from the two halves of the window along one axis) by the sum signal for the same halves of the window. Thus, the generated correcting voltage is voltage (E1X − E2X) or (E1Y − E2Y) weighted by the sum (E1X + E2X) or (E1Y + E2Y), which represents substantially the total energy of the target. If the sum in question is small, the gain in the circuit is high; if on the other hand the sum is high, the gain is low. The weighting circuit consists of an adder 56X, 56Y, which is supplied by memory circuits 54X, 55X and 54Y, 55Y of the channel concerned, and of a divider 58X, 58Y. The divider forms the quotient $$\frac{E1X - E2X}{E1X + E2X}$$

or $$\frac{E1Y - E2Y}{E1Y + E2Y}$$

while holding this ratio substantially constant for a given deviation of the target. The voltage provided by circuits 58X, 58Y constitutes an instantaneous position-error voltage.

The error signal at the output of the divider is processed to make allowance for the speed of the target. The provision of a speed memory makes it possible for the future position of the target to be predicted and for the coefficient by which the error signal is acted on in the loop to be altered by a factor which is calculated on the basis of the relative speed at which the target is moving. The circuit concerned consists of an integrator 59X, 59Y, which is supplied from the output of divider 58X, 58Y, and an adjustable impedance 60X, 60Y shown symbolically as a potentiometric voltage divider. This impedance receives at opposite terminals the aforementioned instantaneous error voltage and the same voltage after it has been integrated at 59X, 59Y.

Changing the position of the movable contact makes it possible to select, for simulataneous extraction, a fraction $k < 1$ of the instantaneous value of signal $$\frac{E1X - E2X}{E1X + E2X}$$

or $$\frac{E1Y - E2Y}{E1Y + E2Y}$$

and a complementary fraciton $(1 - k)$ of its integral. Factors $k$ and $(1 - k)$ are a function of the position of the movable potentiometer contact, which is adjusted in the course of tests so as to proportion the effect which the speed memory has on the gain in the loop. Circuit 60X, 60Y may also consist of an operational amplifier which is connected as an adjustable divider.

The television video tracking system which is described above on the basis of an example makes possible, because of the analogue video processing employed, highly reliable automatic tracking under very demanding operating conditions and in particular where there are major variations in the luminosity of the target and/or of the backgrouund surrounding the target of interest.

This object to be tracked, which is contained in the window, may constitute only part of the whole target seen on the screen, particularly in the case of large targets or those at close range, provided that the part in question contrasts sufficiently with the surrounding parts of the displayed target.

Consequently, the tracking system according to our invention may be effectively employed for various applications in the civil or military fields. It may for example be used for aircraft landing and control or may be built into fire-control systems.

When the camera is mounted on a platform which is secured to a moving vehicle such as a ship, the direction in which it is trained may be stabilized in a known way by means of an inertial unit consisting of gyroscopic devices mounted on the platform. Interface connections are few and this makes the equipment easy to build into an operational system.

Since modifications, varied to fit particular operating requirements, will be apparent to those skilled in the art, the invention is not considered limited to the embodiment shown and described but covers all variations and modifications which do not constitute departures from the spirit and scope of the invention as defined in the appended claims.

What is claimed is:

1. A video tracking system comprising:

a television camera adapted to be trained upon an area of observation containing a target to be tracked;

a television receiver provided with a monitoring screen and connected to said camera for receiving therefrom an input signal to display on said screen a picture of said area of observation including an image of said target, said input signal including synchronizing pulses for controlling a periodic deflection of an electron beam in said receiver in two mutually orthogonal sweep directions;

window-generating means connected to said receiver for delineating on said screen a rectangular window with sides extending in said sweep directions, said window-generating means including a source of scanning voltage controlled by said synchronizing pulses and gating means for passing selected portions of said scanning voltage to said receiver;

manually operable acquisition means adapted to control said source for modifying said scanning voltage to align said window with a desired target image on said screen; and tracking means connected between said camera and said source for keeping the energy center of said target image substantially coincident with the geometrical center of said window upon substantial alignment thereof by said acquisition means, said tracking means including a first pair of measuring circuits responsive to a first pair of timing pulses from said gating means for detecting the energy content of said input signal in respective halves of a beam sweep in one of said directions across said window, a second pair of measuring circuits responsive to a second pair of timing pulses from said gating means for detecting the energy content of said input signal in respective halves of a beam sweep in the other of said directions across said window, first comparison means connected to said first pair of measuring circuits for generating a first error signal proportional to a difference in said energy content on a beam sweep in said one of said directions, second comparison means connected to said second pair of measuring circuits for generating a second error signal proportional to a difference in said energy content on a beam sweep in said other of said directions, and circuitry for applying said error signals to said source for further modifying said scanning voltage.

2. A system as defined in claim 1 wherein each of said measuring circuits comprises an integrator for said input signal and a memory in series with said integrator for preserving the output thereof to the end of a sweep cycle.

3. A system as defined in claim 1 wherein said tracking means comprises selector means triggerable by pulses timed to occur close to a sweep of said window for producing a recurrent background signal, integrating means connected to said selector means, storage means for the integrated background signal connected to said integrating means, comparison means connected to receive said input signal from said camera together with the integrated background signal from said storage means for deriving an output signal therefrom, and full-wave rectifier means connected to said comparison means for delivering the rectified output signal to said measuring circuits.

4. A system as defined in claim 1 wherein said circuitry includes two weighting circuits for dividing each of said error signals by the total energy content detected by the respective pair of measuring circuits.

5. A system as defined in claim 4 wherein said circuitry further includes two adjustable dividers respectively connected to said weighting circuits for receiving the divided error signals therefrom, and two voltage dividers each connected between one of said integrators and the respective weighting circuit for splitting the divided error signal thereof into relatively variable integrated and nonintegrated fractions.

6. A system as defined in claim 1 wherein said source comprises a generator of sawtooth voltage and summing means for superimposing modifying voltages from said acquisition means and said tracking means upon said sawtooth voltage.

7. A system as defined in claim 6 wherein said window-generating means comprises three voltage comparators for each of said directions having three threshold voltages applied to respective inputs thereof and having other inputs connected in parallel to an output of said summing means, said threshold voltages determining the beginning, middle and end of a window sweep, said gating means being connected to said comparators.

8. A system as defined in claim 6 wherein said acquisition means comprises a light pen positionable adjacent said screen for picking up light pulses and converting same into an electrical start signal, said light pen having an output circuit connected to said summing means for transmitting thereto a positioning voltage derived from said start signal.

9. A system as defined in claim 8 wherein said output circut includes switchover means for replacing said start signal at the end of a predetermined period by a feedback signal from said window-generating means.

10. A system as defined in claim 9 wherein said output circuit includes sampling means connected to said generator of sawtooth voltage and memory means for storing the magnitude of said sawtooth voltage determined by said sampling means at the instants of said start and feedback signals.

* * * * *